(No Model.) 4 Sheets—Sheet 1.

W. CLANCY.
APPARATUS FOR CLEANING AND CONCENTRATING ORES.

No. 476,035. Patented May 31, 1892.

WITNESSES:
INVENTOR:
William Clancy,

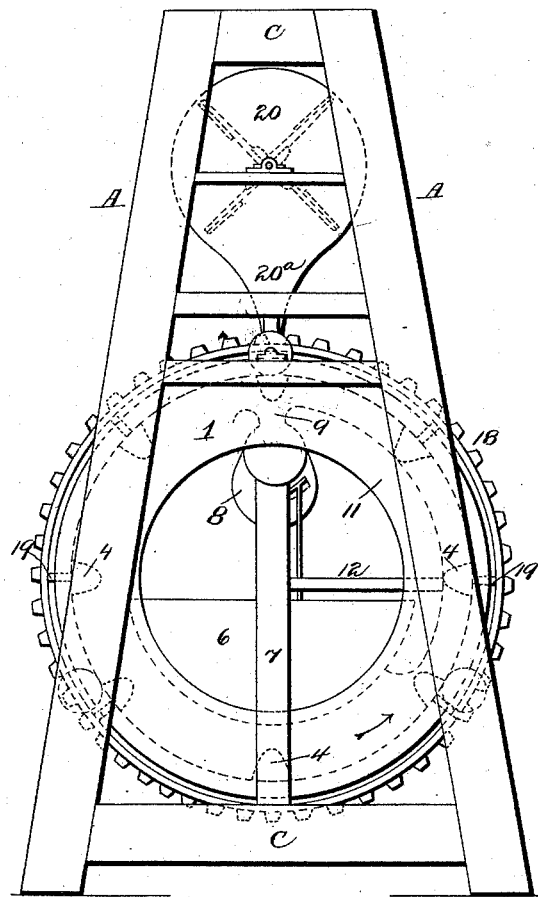
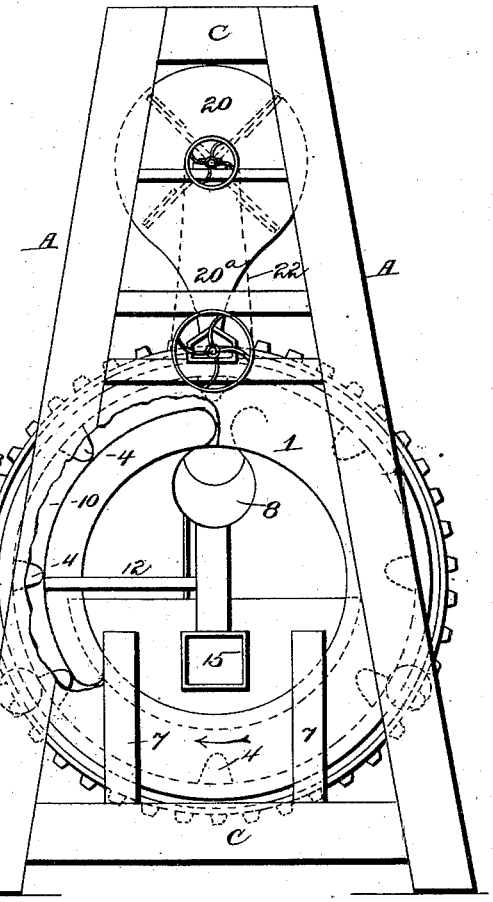
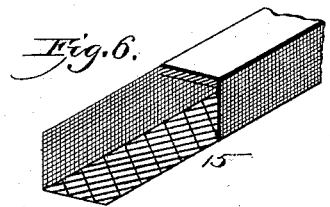

(No Model.) 4 Sheets—Sheet 3.

W. CLANCY.
APPARATUS FOR CLEANING AND CONCENTRATING ORES.

No. 476,035. Patented May 31, 1892.

WITNESSES:
F. L. Ourand
W. L. Coombs

INVENTOR:
William Clancy,
by Sims Dagger & Co.
Attorneys

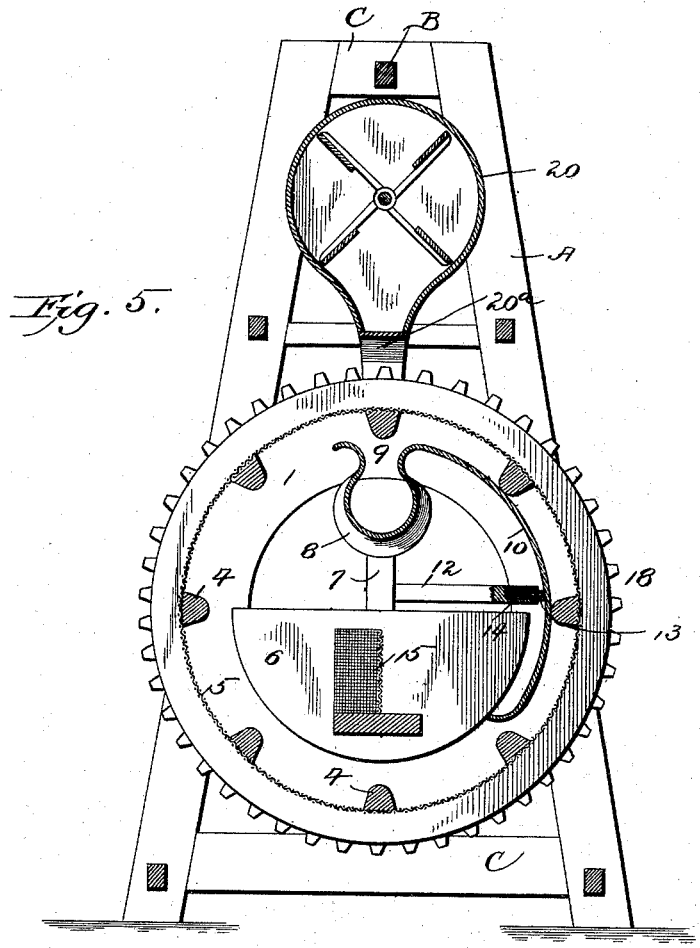

UNITED STATES PATENT OFFICE.

WILLIAM CLANCY, OF ANACONDA, MONTANA.

APPARATUS FOR CLEANING AND CONCENTRATING ORES.

SPECIFICATION forming part of Letters Patent No. 476,035, dated May 31, 1892.

Application filed May 11, 1891. Serial No. 392,358. (No model.)

*To all whom it may concern:*

Be it known that I, WILLIAM CLANCY, a citizen of the United States, and a resident of Anaconda, in the county of Deer Lodge and State of Montana, have invented certain new and useful Improvements in Apparatus for Screening and Concentrating Ores; and I do hereby declare that the following is a full, clear, and exact description of the invention, which will enable others skilled in the art to which it appertains to make and use the same, reference being had to the accompanying drawings, which form a part of this specification.

My invention relates to apparatus for screening or concentrating ore, the object being to provide an improved construction whereby leaves, twigs, and other rubbish may be removed from the screen, thereby preventing clogging of the same and preventing their being carried into the settling or separating tanks.

The invention consists in the novel construction and combination of parts hereinafter fully described, and specifically pointed out in the claims.

Figure 1:
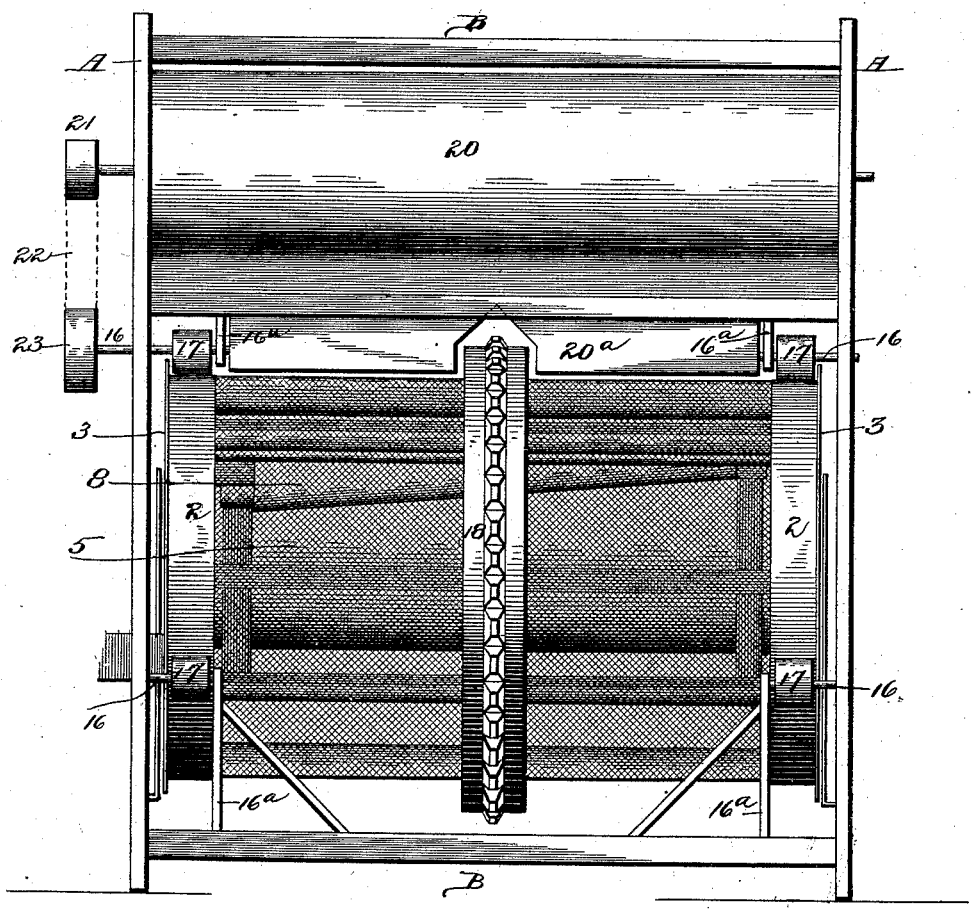
Figure 4:
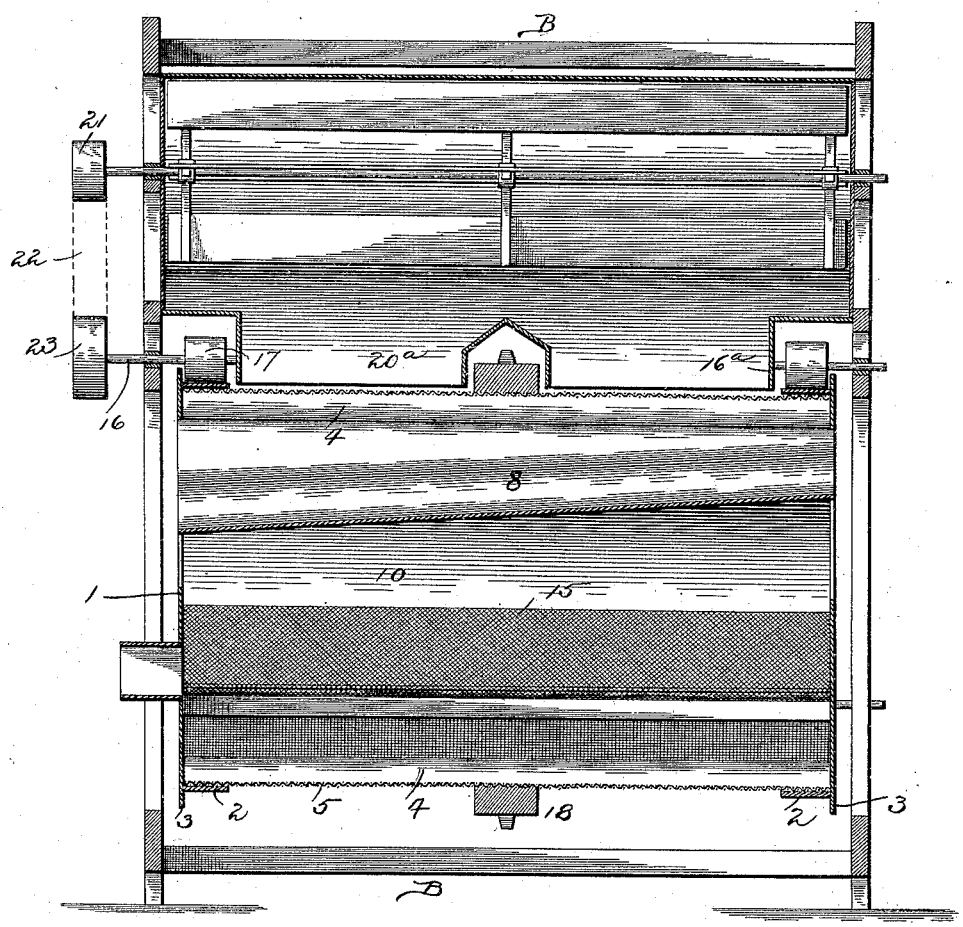

In the accompanying drawings, Figure 1 is a side elevation of a screen or separator constructed in accordance with my invention. Fig. 2 is an end view of the same. Fig. 3 is a similar view looking in the opposite direction, the lower part being broken away to show the interior thereof. Fig. 4 is a central longitudinal section, and Fig. 5 is a central cross-section, of the machine. Fig. 6 is a detail perspective view of the flume.

The screen proper consists of the cast-iron heads 1, having inwardly-projecting cylindrical rims 2 and annular flanges 3, which serve as guides for the rollers hereinafter described. These heads are open at their centers and are connected together by V-shaped ribs 4, forming a skeleton drum or cylinder, which is covered with wire-gauze or perforated metal 5. The central openings in the heads at the lower portions are closed by means of removable plates 6, and uprights or supports 7 are provided, to the upper ends of which is secured a tapering trough 8, one end thereof being considerably larger than the other. This trough extends the full length of the drum and at its upper side is provided with a slot or opening 9, extending from end to end thereof.

In the interior of the drum, at one side thereof, is a segmental shield 10, consisting, preferably, of a curved plate of wire-gauze or perforated metal, the upper end of which terminates in close proximity to the slot in the trough. This shield extends from end to end of the drum and is connected with the supports 7 by means of the arms 12. The outer ends of these arms are made tubular or recessed to receive a sliding rod 13, secured to the shield, and which is provided with a coiled spring 14, by means of which the shield is kept pressed up against the ribs 4.

Located in the drum is a feed-flume 15, which extends from end to end thereof, the bottom of which is provided with large diagonal meshes to break the fall of the water and material fed to the drum. This flume extends diagonally through the machine and is preferably open at its top and at the side nearest to the shield, as seen in Fig. 6.

Journaled in short shafts 16, projecting inwardly from the uprights, and in the supports $16^a$, secured to the cross-bars thereof, are four rollers 17, which support and hold the drum in position, and in the center of the drum is a sprocket-wheel 18, secured to the ribs 4 by means of bolts 19. By means of a sprocket-chain connected with any suitable motor the drum can be rotated.

Situated above the drum and supported by the uprights is a rotary fan or blower 20, the discharge-spout $20^a$ of which terminates at a point outside the drum just above the slot in the trough 8. The shaft of the fan is provided with a pulley 21, which, by means of a belt, can be connected with a pulley 23 on one of the journals of the upper rollers 17.

The operation is as follows: The material to be screened is fed to the drum through the flume 15, which, as before stated, extending diagonally through the drum, causes the material to be deposited therein at the side opposite to the shield 10. The drum is now rotated in the direction of the arrow, when the V-shaped ribs will catch the leaves and other rubbish and carry them around between the shield and the outer covering of the drum until they reach the slot in the trough 8, when they will fall therein and be carried off, being aided by the air-blast from the fan or blower, which is operated by means of the pulleys, belt, and the roller 17, connected therewith, the roller 17 being operated by frictional contact with the head of the drum. The air-blast also serves to clear the meshes of the screen from any matter which would tend to clog the same.

From the above it will be seen that the leaves and other rubbish are carried away through the trough and thus prevented from clogging the screen and from being carried to the separating-tanks.

Having thus described my invention, what I claim is—

1. In an ore screening or concentrating apparatus, the combination, with the rotatable drum consisting of the heads, the V-shaped ribs connecting the same, and the reticulated covering, of the tapering trough having a slot or opening in its upper side, the segmental shield in said drum, the arms connecting said shield with suitable supports having tubular ends, the rods working in the said tubular ends, and the coiled springs for pressing the shield against the ribs, substantially as described.

2. In an ore screening or concentrating machine, the combination, with the rotatable drum consisting of the heads, the V-shaped ribs, and the reticulated covering, of the segmental shield, the tapering trough having a slot in its upper side, and the feed-flume extending diagonally through the drum and its bottom having large meshes, substantially as described.

3. In an ore screening or concentrating apparatus, the combination, with the rotatable drum, the segmental shield, the tapering trough having a slot in its upper side, and the feed-flume, of the fan or blower having its discharge-spout above and in proximity to said trough, substantially as described.

4. In an ore screening or concentrating apparatus, the combination, with the uprights and cross-bars, the rotatable drum consisting of the heads 1, having arms 2 and flanges 3, the V-shaped ribs connecting said heads, and the central sprocket-wheel 18, bolted to said ribs, of the segmental shield 10, the trough 8, having a slot in its upper end, the feed-flume 15, the fan or blower 20, the pulley on the shaft of said fan, the rollers 17, the pulley 23 on the shaft of one of said rollers, and the belt 22, connecting said pulleys, substantially as described.

In testimony that I claim the foregoing as my own I have hereunto affixed my signature in presence of two witnesses.

WILLIAM CLANCY.

Witnesses:
A. J. BLIX,
DENNIS McAVOY.